United States Patent
Cariou

(10) Patent No.: US 11,268,478 B2
(45) Date of Patent: Mar. 8, 2022

(54) SOUND-PROOFING COVERING COMPRISING A CELLULAR STRUCTURE WITH CURVED CELLS FORMED ON EITHER SIDE OF ONE AND THE SAME INNER WALL

(71) Applicant: Airbus Operations SAS, Toulouse (FR)

(72) Inventor: Charles Cariou, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 484 days.

(21) Appl. No.: 16/281,617

(22) Filed: Feb. 21, 2019

(65) Prior Publication Data
US 2019/0264637 A1   Aug. 29, 2019

(30) Foreign Application Priority Data
Feb. 28, 2018 (FR) ...................................... 1851751

(51) Int. Cl.
| | |
|---|---|
| *F02K 1/82* | (2006.01) |
| *F02C 7/045* | (2006.01) |
| *B64D 33/02* | (2006.01) |
| *F02C 7/24* | (2006.01) |
| *G10K 11/172* | (2006.01) |

(52) U.S. Cl.
CPC .............. *F02K 1/827* (2013.01); *F02C 7/045* (2013.01); *B64D 2033/0206* (2013.01); *F02C 7/24* (2013.01); *F05D 2250/283* (2013.01); *F05D 2250/75* (2013.01); *F05D 2260/963* (2013.01); *G10K 11/172* (2013.01)

(58) Field of Classification Search
CPC ............. G10K 11/172; F05D 2260/963; F05D 2250/75; F05D 2250/283; B64D 2033/0206; F02C 7/24; F02C 7/045; F02K 1/827
USPC ......................................................... 181/210
See application file for complete search history.

(56) References Cited

U.S. PATENT DOCUMENTS

| | | | |
|---|---|---|---|
| 4,433,751 A | 2/1984 | Bonneau | |
| 10,160,533 B2 * | 12/2018 | Koreis | ...................... B32B 7/14 |
| 10,363,726 B2 * | 7/2019 | Butler | ................ B29D 99/0021 |

(Continued)

FOREIGN PATENT DOCUMENTS

GB   1470036 A   4/1977

OTHER PUBLICATIONS

French Search Report; priority document.

*Primary Examiner* — Forrest M Phillips
(74) *Attorney, Agent, or Firm* — Greer, Burns & Crain, Ltd.

(57) ABSTRACT

A sound-proofing covering comprising a cellular structure, each cell of which comprises a duct extending at least between the first face and the second face of the covering. The duct is formed between an outer wall and an inner wall of the cell and has a restriction of its cross section. The outer and inner walls have rounded forms, without sharp edges. The cell comprises a cavity in which the duct emerges. Thus, each cell forms a resonator comprising a neck formed by the duct and the cavity. Each cell is conformed such that the duct and the cavity are formed on either side of the inner wall. Such a covering is particularly suitable for reducing acoustic waves in aircraft engine plant nacelles, particularly in the low frequencies.

8 Claims, 5 Drawing Sheets

(56) References Cited

U.S. PATENT DOCUMENTS

| | | | |
|---|---|---|---|
| 10,443,496 B2 * | 10/2019 | Herrera | B32B 5/024 |
| 10,465,707 B2 * | 11/2019 | Care | F04D 29/663 |
| 10,479,520 B2 * | 11/2019 | Waldrop, III | B32B 27/12 |
| 10,822,865 B2 * | 11/2020 | Peng | H05K 7/20736 |
| 10,858,994 B2 * | 12/2020 | Parry | F01D 25/24 |
| 10,902,834 B2 * | 1/2021 | Thomas | F02K 1/827 |
| 10,994,856 B2 * | 5/2021 | Alonso-Miralles | B32B 7/02 |
| 2015/0060194 A1 | 3/2015 | Pongratz et al. | |
| 2015/0292413 A1 | 10/2015 | Soria et al. | |

* cited by examiner

SOUND-PROOFING COVERING COMPRISING A CELLULAR STRUCTURE WITH CURVED CELLS FORMED ON EITHER SIDE OF ONE AND THE SAME INNER WALL

CROSS-REFERENCES TO RELATED APPLICATIONS

This application claims the benefit of the French patent application No. 1851751 filed on Feb. 28, 2018, the entire disclosures of which are incorporated herein by way of reference.

FIELD OF THE INVENTION

The present invention relates to the field of sound-proofing structures.

It relates in particular to a sound-proofing covering with cellular structure. The covering that is the subject of the invention can have applications, in particular in the aeronautical field, for example in aircraft engine plant nacelles.

BACKGROUND OF THE INVENTION

Coverings or panels comprising a cellular structure composed of cells, that is to say, juxtaposed hollow unitary volumes, are employed in many technical fields, particularly in the aeronautical field. They can exhibit great rigidity for a low weight. The coverings comprising a cellular structure having cells that are open on one face, or at the very least, cells that communicate with the outside of the panel, are employed for their sound-proofing properties. Such panels are sometimes called acoustic panels.

The panels or coverings with cellular structure can be formed in various materials, for example, plastic, composite, or metal materials. The cells can have various geometries. A well-known cellular structure form has cells in the form of straight prisms with a hexagonal base. The term "honeycomb" structure is often used to denote this type of structure with hexagonal cells, but this expression is also employed misleadingly to denote cellular panels that have other forms of cells.

Thus, a conventional acoustic panel or covering generally comprises a honeycomb core interposed between a perforated sheet forming a first face and a solid sheet blocking the cells and forming a second face of the covering.

The cells of the acoustic panels act as small resonators allowing the absorption of the acoustic waves over a given frequency band. For a resonator to be effective, its absorption frequency band must include the frequency to which the panel is subjected, Now, the cavities of relatively small size of the acoustic panels correspond to high frequencies. It is thus difficult to obtain a cellular panel that is effective for certain applications subject to low frequencies.

For example, the engine plants of commercial aircraft comprise a turbojet engine and a nacelle that can comprise an acoustic covering to attenuate the noise generated in the operation of the engine. Nevertheless, the acoustic frequencies generated by the engine of an aircraft are relatively low and extend over a fairly wide range. The low frequencies that have to be attenuated are, for example, the frequencies below 2000 Hz depending on the engine concerned. The adoption of engine plants of large diameter tends to lower even further the frequencies of the acoustic waves that they generate. Now, the need to have cells of large volume to absorb low frequencies is leading to panels of great thickness that are incompatible with an aeronautical application.

The document US2015292413 presents an acoustic panel in which the geometry of the cells is improved for the purposes of an application to an airplane engine. In particular, the cells of the acoustic covering described by the document US2015292413 extend according to a curved, "S" shaped form, so as to elongate them. The increase in the length of the cells allows the absorption of lower frequencies for one and the same panel thickness than with straight cells. Nevertheless, the shift, to the lower frequencies, of the band of the frequencies absorbed compared to the band of the frequencies absorbed by a covering with straight cells, is limited.

The invention sets out to propose a sound-proofing covering with cellular structure, that is improved so that it allows a sound-proofing over low frequencies and a wide band of frequencies, compared to the coverings known from the state of the art, with constant thickness and comparable weight.

SUMMARY OF THE INVENTION

Thus, the invention relates to a sound-proofing covering comprising a cellular structure, the covering having a first face and a second face, the cellular structure being formed by cells that are open on the first face and closed on the second face, the cells being juxtaposed in a first, so-called longitudinal direction and in a second, so-called transverse direction which is orthogonal to the longitudinal direction. Each cell comprises a duct extending at least between the first face and the second face, the duct being formed between an outer wall and an inner wall of the cell and having a restriction of its section. The outer wall and the inner wall have rounded forms, without sharp edges. Each cell comprises a cavity in which the duct emerges. The cell forms a resonator comprising a neck formed by the duct and the cavity. The cell is conformed such that the duct and the cavity are formed on either side of the inner wall.

The adoption of such a cell configuration makes it possible to obtain a resonator suitable for treating low frequencies compared to the cells of a covering of the same thickness constructed according to the state of the art. The volute geometry, in particular, makes it possible to obtain a resonator neck that is particularly long, potentially of small section, while maintaining a cavity of significant volume. Furthermore, this geometry confers on the cell an impedance making it possible to reduce the incident noise.

Each cell of the covering can have a substantially volute section in a longitudinal cutting plane at right angles to the transverse direction.

The inner wall of a cell of the covering and the outer wall of an adjacent cell can meet so as to form only a transverse wall separating the cell from the adjacent cell at the first face. There is, thus, no loss of acoustic surface between the cells. In particular, the inner wall of a cell of the covering and the outer wall of an adjacent cell can meet at the first face, forming between them an acute angle so as to form a transverse edge at the first face. The transverse wall separating the cell from the adjacent cell at the first face is therefore limited in this case to just this transverse edge. This configuration favors the entry of the acoustic waves into the cells of the covering.

The duct of each cell can comprise, in succession:

a first portion starting from the first face of the sound-proofing covering towards the second face of the sound-proofing covering, and a curved second portion comprising an inlet and an outlet, and forming, between a direction of the duct at the inlet of the second portion and a direction of the duct at the outlet of the second portion, an angle of between 90° and 180°.

The first portion of duct can be substantially symmetrical along a transverse plane at right angles to the first face.

The outer and inner walls can advantageously have rounded forms, without sharp edges.

The duct of the cell forming the neck of the resonator and the cavity are, for example, dimensioned such that the resonant frequency of the resonator is lower than 2000 Hz.

The first face can comprise a resistive sheet allowing the cells of the covering to communicate with the outside of the covering.

The inner wall of each cell can comprise a perforation fluidically linking the neck to the cavity of the resonator.

The invention relates also to an aircraft engine plant comprising a nacelle and an engine, in which an inner surface of the nacelle and/or an outer surface of a casing of the engine has a sound-proofing covering as previously described.

BRIEF DESCRIPTION OF THE DRAWINGS

Other particular features and advantages of the invention will become more clearly apparent from the following description.

In the attached drawings, given as nonlimiting examples.

DETAILED DESCRIPTION OF THE PREFERRED EMBODIMENTS

Throughout the following description, the terms "covering" and "panel" are generally interchangeable. In fact, a sound-proofing panel is generally intended to be affixed to a supporting element, and in this sense, it constitutes a covering. Furthermore, a panel is not limited to a flat geometry. Likewise, a sound-proofing covering comprising a cellular structure is formed by a panel, that can be affixed to a supporting element, and has or does not have a flexibility allowing it to be conformed to the supporting element.

Figure 1:
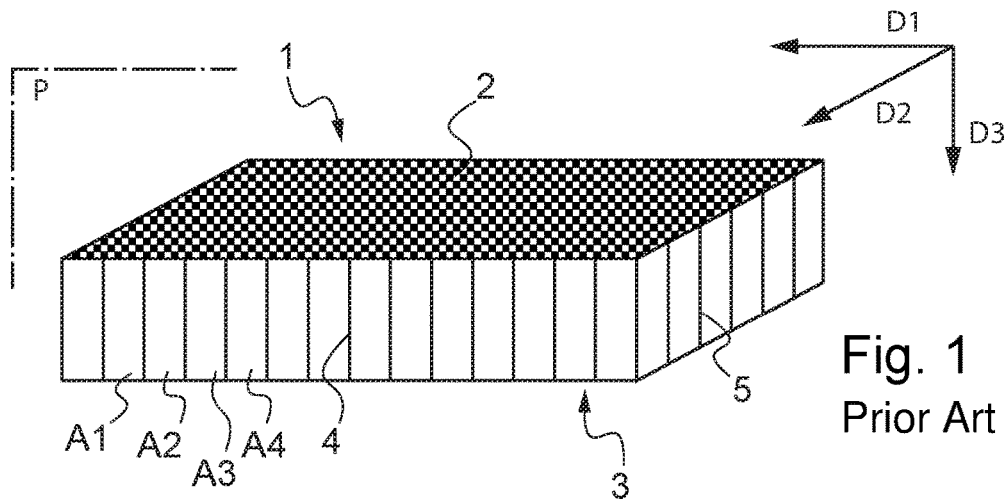
FIG. 1 represents, by a three-dimensional schematic view, a sound-proofing covering of the state of the art.

FIG. 1 schematically represents a sound-proofing covering known from the state of the art. It comprises cells A1, A2, A3, A4, etc., juxtaposed with one another in two mutually orthogonal directions so as to form a cellular structure. Arbitrarily, a first direction D1 of juxtapositioning of the cells is called longitudinal, and a second direction D2 of juxtapositioning of the cells, orthogonal to the first direction D1, is called transverse. A third direction D3 is defined orthogonally to the first direction D1 and second direction D2.

On a first face 1 of the covering, cells A1 ... A4 are open. A perforated sheet 2 covers them, allowing the cells A1 ... A4 to communicate with the outside environment.

On a second face 3, the cells A1 ... A4 are closed, for example by a solid sheet blocking the bottom of the cells.

Figure 2:
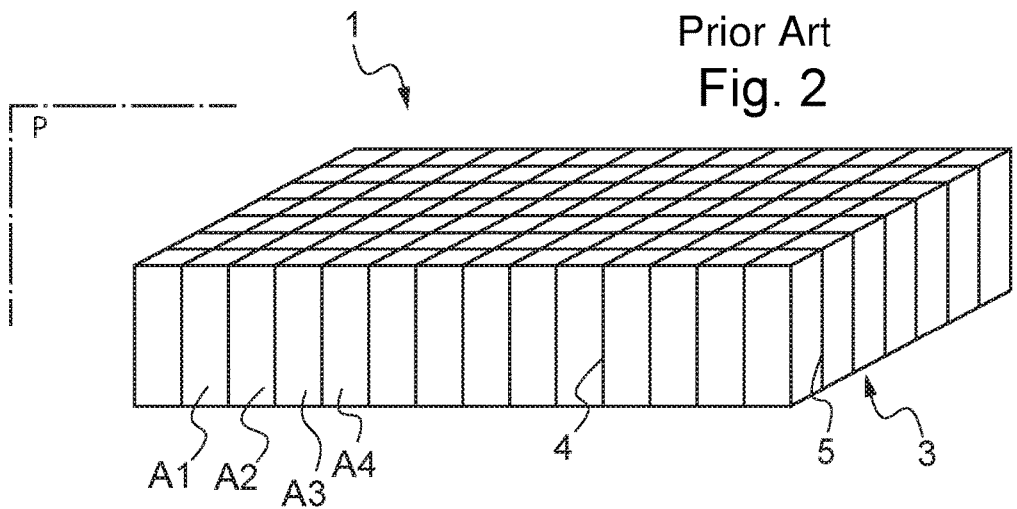
FIG. 2 represents, by a three-dimensional schematic view, the cellular structure of the sound-proofing covering of FIG. 1.

In order to better explain the cellular structure, the sound-proofing covering of FIG. 1 is represented in FIG. 2 without the perforated sheet 2. The cells of the cellular structure represented here are said to be square, in as much as their volume is that of a straight prism of square base extending between the first face 1 and the second face 3 of the sound-proofing covering. In the example represented here, the cells are juxtaposed so as to form a regular grid. Thus, each cell is adjacent to two cells longitudinally and to two cells transversely, apart from the obvious exception of the cells situated on the edges of the covering.

Figure 3:
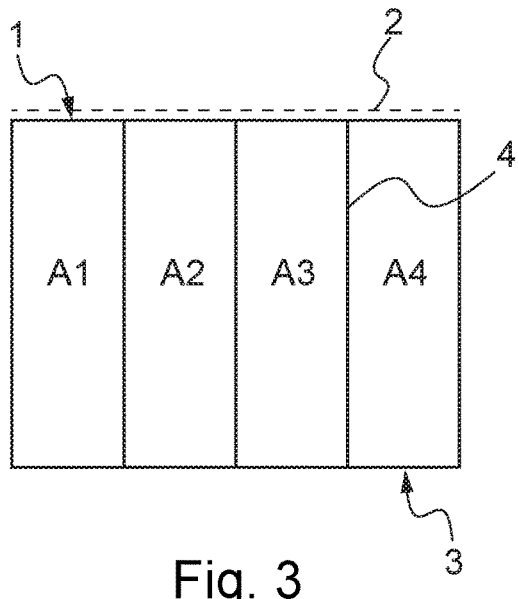
FIG. 3 represents, by a cross-sectional schematic view, four adjacent cells of the cellular structure of FIGS. 1 and 2.

FIG. 3 represents four cells A1 ... A4 of the cellular structures of the sound-proofing coverings represented in FIGS. 1 and 2, along the longitudinal cutting plane P represented in FIGS. 1 and 2. The cutting plane P passes longitudinally through the cells of the sound-proofing covering, and is orthogonal to the first face 1 and to the second face 3 in the case of a flat covering or panel. Each cell is separated from adjacent cells by a transverse wall 4 which is straight, and which links the first face 1 and the second face 3 orthogonally thereto. In the longitudinal direction, longitudinal walls 5 separate the cells, likewise.

The following FIGS. 4 to 15 represent all or part of a sound-proofing covering conforming to various embodiments of the invention, given as examples. In particular, FIGS. 4 to 14 represent cross-sectional views of cells according to different embodiments of the invention, along a cutting plane similar to the cutting plane of FIG. 3. In order to simplify the understanding of the embodiments presented in FIGS. 4 to 14, by comparison to the conventional cellular structure of FIGS. 1 to 3, the cross sections of the cells of the sound-proofing coverings according to the invention are represented (by heavy lines) overprinted on the cross section of the cells of the conventional structure of FIGS. 1 to 3 (thin lines).

Figure 4:
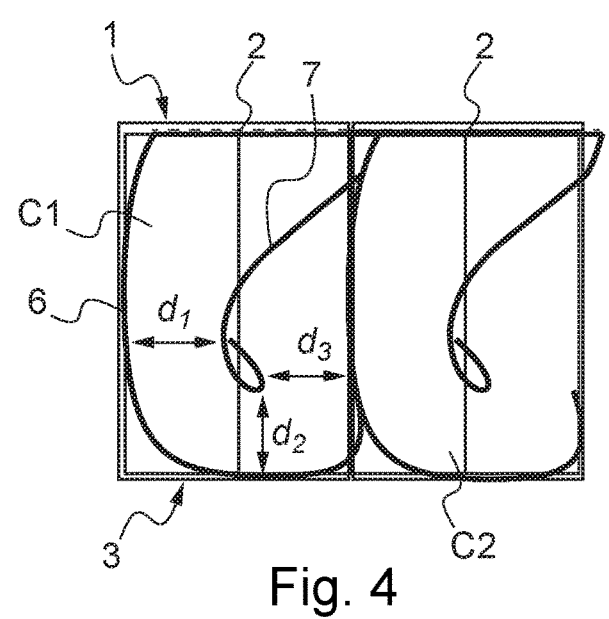
FIG. 4 represents, by a cross-sectional schematic view, two juxtaposed cells of a sound-proofing covering according to an embodiment of the invention.

FIG. 4 represents two cells C1, C2 of a sound-proofing covering conforming to an embodiment of the invention.

In the invention, each cell of the cellular structure has a section, along the cutting plane P, defined by an outer wall 6 and an inner wall 7. The outer wall 6 and the inner wall 7 form a duct. This duct emerges in a closed cavity. Thus, each cell forms a resonator, that can be likened to a Helmholtz resonator, whose neck is formed by the duct.

The duct is curved, such that the duct and the cavity are formed on either side of the inner wall 7.

The cell can thus have, as is the case in the embodiments presented in FIGS. 4 to 13, a generally volute form. A volute corresponds to an approximately spiral two-dimensional form.

Each cell of the embodiment represented in FIG. 4 has, in the longitudinal direction, substantially the same dimension as two cells according to the state of the art represented in FIG. 3. At the first face 1, each cell C1, C2 is open, and has an open surface corresponding substantially to the open surface of two cells according to the state of the art represented in FIG. 3.

In the transverse direction, as described in more detail with reference to FIG. 15, the cellular structure comprises longitudinal walls 5 similar to those of the state of the art represented in FIGS. 1 to 3. The outer wall 6 and the inner wall 7 are orthogonal to the longitudinal walls 5. The section or surface of passage of this duct has, starting from the open face of the cell and working towards the bottom of the cell, a narrowing (forming a restriction of the section of passage of the duct).

For example, in the embodiment of FIG. 4, just as in many other embodiments that can be envisaged, the duct of the cell C1, C2 comprises a first portion of duct starting from the open face of the cell (at the first face 1 of the sound-proofing covering) towards the second face 3 of the sound-proofing covering, followed by a second curved portion, forming, in this embodiment, an angle of 180° between the direction of the duct at its inlet and the direction of the duct at its outlet, in the cutting plane P. In other words, the duct forms, at the second portion, a half-turn before emerging in the cavity of the cell. The curved portion turning 180° formed by the second portion of duct has, in the example represented, a direction at its inlet substantially parallel to the third direction D3 and oriented from the first face 1 towards the second face 3, and this curved portion has an outlet also substantially parallel to the third direction D3 and oriented from the second face 3 towards the first face 1.

The second portion emerges in a cavity, that is to say a closed volume of widened section.

The narrowing of the duct can be continuous, progressive or not, and extend over the first portion of duct or over the first and the second portions of duct.

The cell can thus have a dimension at the inlet of the duct which forms it, measured between the outer wall 6 and the inner wall 7 at the open face of the cell, which is greater than a first dimension d1 measured, in the first direction D1, between the outer wall 6 and the inner wall 7 at the limit between the first portion and the second portion.

The first dimension d1 can be greater than a second dimension d2 measured, in the third direction D3, between the outer wall 6 and the inner wall 7 at the curved portion where the duct is parallel and tangential to the second face 3 of the covering. The second dimension d2 is thus measured at the point where the duct has formed a curve turning 90° in the cutting plane P relative to the general direction of the first portion of the duct, namely the third direction D3. The duct is thus oriented in the first direction D1 at the point where the second dimension d2 is measured.

The second dimension d2 can be greater than a third dimension d3, measured in the first direction D1 between the outer wall 6 and the inner wall 7 at the inlet of the cavity.

Figure 15:
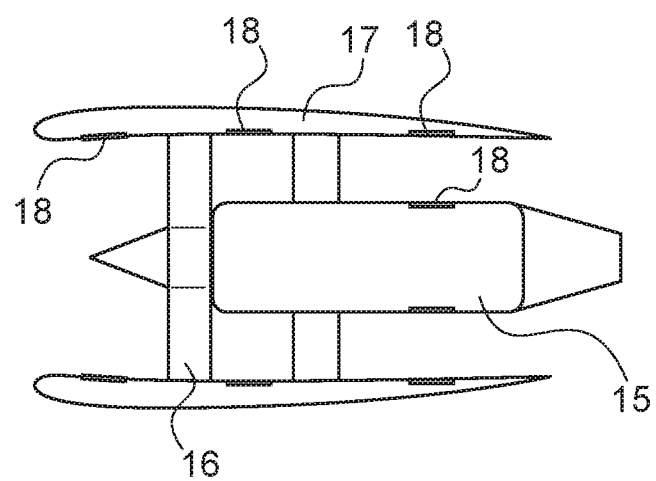
FIG. 15 schematically represents, by a cross-sectional view, an aircraft engine plant whose nacelle is equipped with a sound-proofing covering.

In as much as the cells are defined between parallel longitudinal walls 5 as shown in more detail with reference to FIG. 15, they have a dimension that is constant in the second direction D2. Thus, the section of passage of the duct is rectangular, and the surface of this section of passage is proportional to the distance between the outer wall 6 and the inner wall 7.

Figure 5:
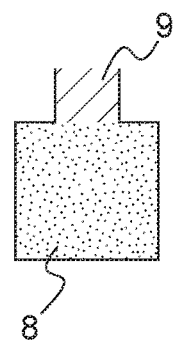
FIG. 5 illustrates, in cross-sectional schematic views, the principle implemented in the invention by comparison of a conventional Helmoltz resonator with a sound-proofing covering cell according to an embodiment of the invention detailed in FIG. 7.
Figure 5:
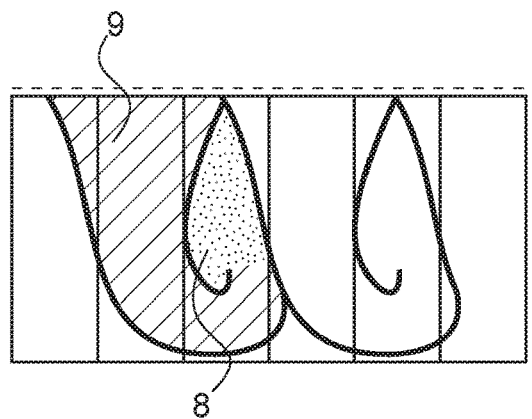

FIG. 5 illustrates the principle implemented in the invention. On the left in FIG. 5, there is shown, in cross section and highly schematically, a Helmholtz resonator as known from the state of the art. A Helmholtz resonator comprises a closed cavity 8 of volume V which communicates with the outside via a small tube of length L and of section A, called neck 9.

The natural frequency F0 of a standard Helmholtz resonator is thus:

$$F_0 = \frac{c}{2\pi}\sqrt{\frac{A}{VL}}$$

in which c is the speed of sound.

Thus, in the invention, each cell forms a pseudo-Helmholtz resonator whose neck is formed by the duct from the inlet of the cell and a cavity in which the duct emerges.

In FIG. 5, the neck of the cell is shown shaded, whereas the cavity is represented by a dotted texture.

Compared to the state of the art, in which the cell forms a volume and the orifices of the pierced sheet which tops the cell form a neck, the length L of the neck formed in the invention by the duct of the cell is very greatly increased, which lowers the natural frequency of the resonator.

FIGS. 6 to 14 represent alternative embodiments of the invention based on the principle described previously. These embodiments share in particular the fact that the outer wall 6 and the inner wall 7 which define the duct which forms the cell have rounded forms, without sharp edges, in order not to disturb the propagation of the waves in the cell. Furthermore, the longitudinally juxtaposed cells are nested relative to one another, without any dead volume. This avoids any loss of acoustic surface and maximizes the performance, in sound-proofing terms, of the covering.

Figure 6:
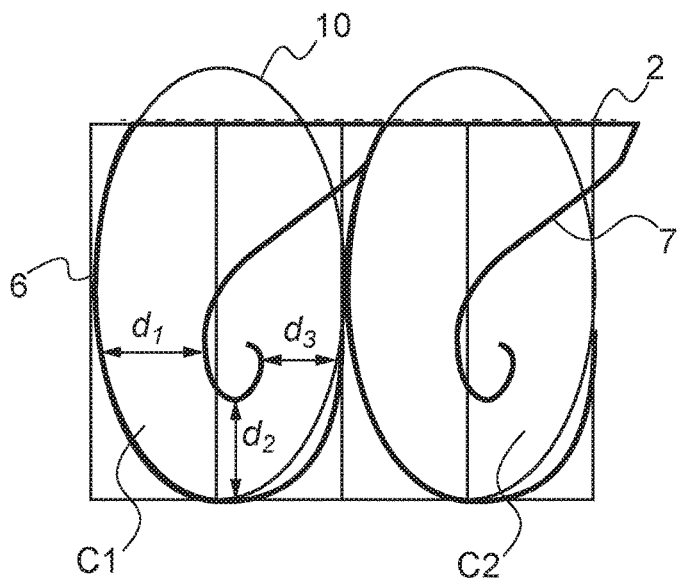
FIGS. 6 and 7 represent, by a cross-sectional schematic view, two juxtaposed cells of a sound-proofing covering according to embodiments of the invention.

FIG. 6 presents in particular two cells C1,C2 of a sound-proofing covering according to an embodiment of the invention in which the geometry of the cell, seen in cross section along the cutting plane P, is based on an ellipse 10 represented by a fine line. In particular, the outer wall 6 seen in the cutting plane P follows the line of the ellipse 10 over one or more portions of the ellipse 10, particularly at least partially (and in the example here represented totally) over a portion linking the first face 1 to the second face 3.

In the example represented in FIG. 6, the dimensions d1, d2 and d3 defined as previously explained with reference to FIG. 4 are such that d1>d2>d3.

Figure 7:
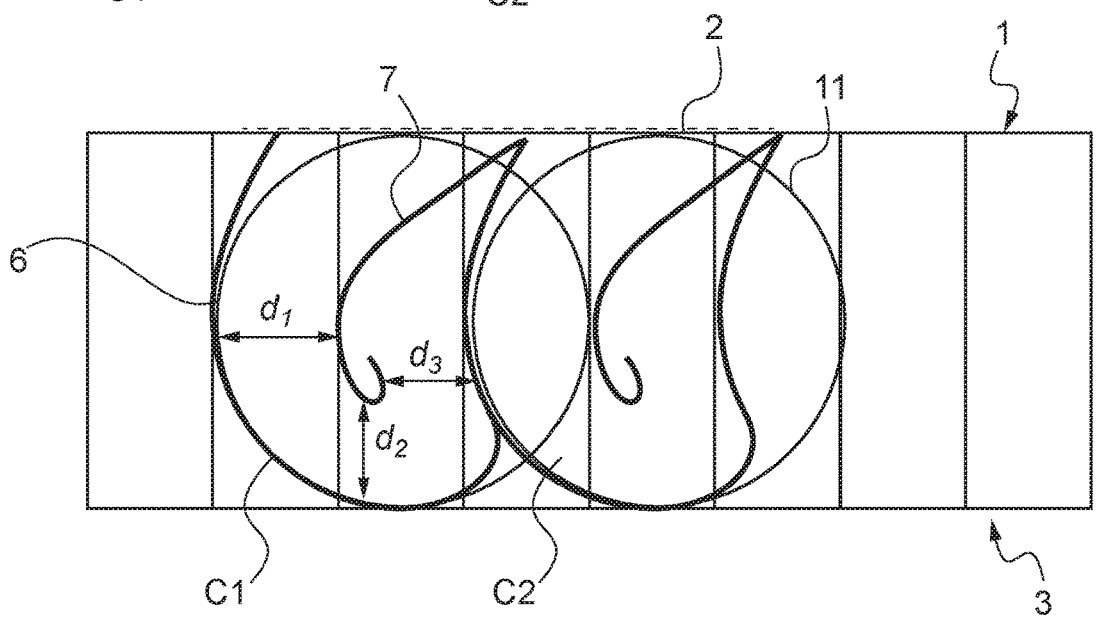

FIG. 7 presents two cells C1,C2 of a sound-proofing covering according to an embodiment of the invention in which the geometry of the cell seen in cross section along the cutting plane P is based on a circle 11 represented by a fine line. In particular, the outer wall 6, seen in the cutting plane P, follows the line of the circle 11 at least partially over a portion linking the first face 1 to the second face 3.

In the example represented in FIG. 7, the dimensions d1, d2 and d3 defined as previously explained with reference to FIG. 4 are such that d1>d2>d3.

Figure 8:
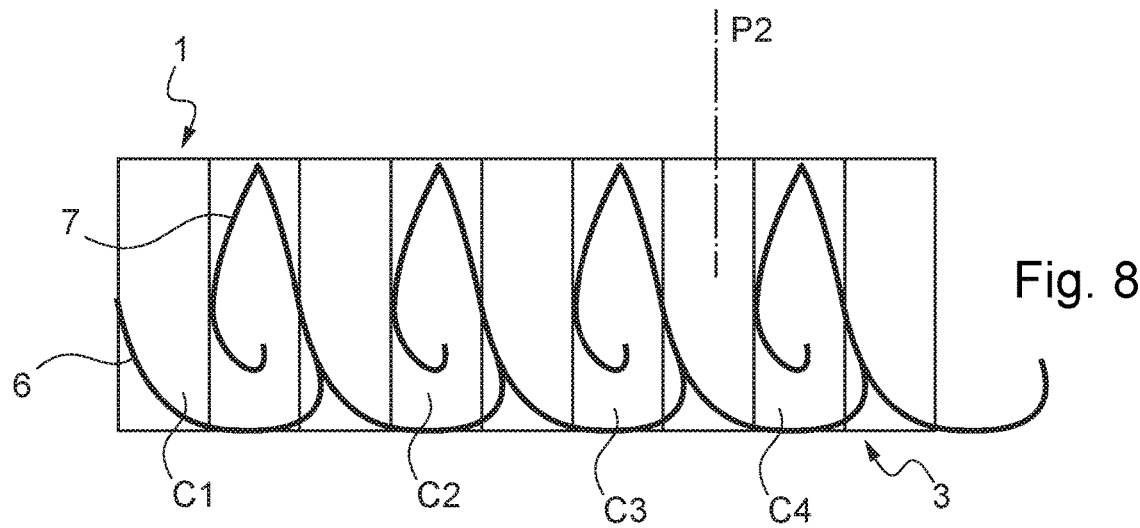
FIGS. 8 and 9 represent, by a cross-sectional schematic view, juxtaposed cells of sound-proofing coverings according to embodiments of the invention.

FIG. 8 represents four cells C1 ... C4 of a sound-proofing covering according to an embodiment of the invention. This embodiment has in particular the particular feature that the first portion of the duct, between the inlet of the cell and the start of the curved second portion has a symmetry or a quasi-symmetry along a plane of symmetry P2 orthogonal to the cutting plane P and to the first face 1 of the covering. This apparent symmetry allows a treatment on the acoustic behavior that is virtually symmetrical.

Figure 9:
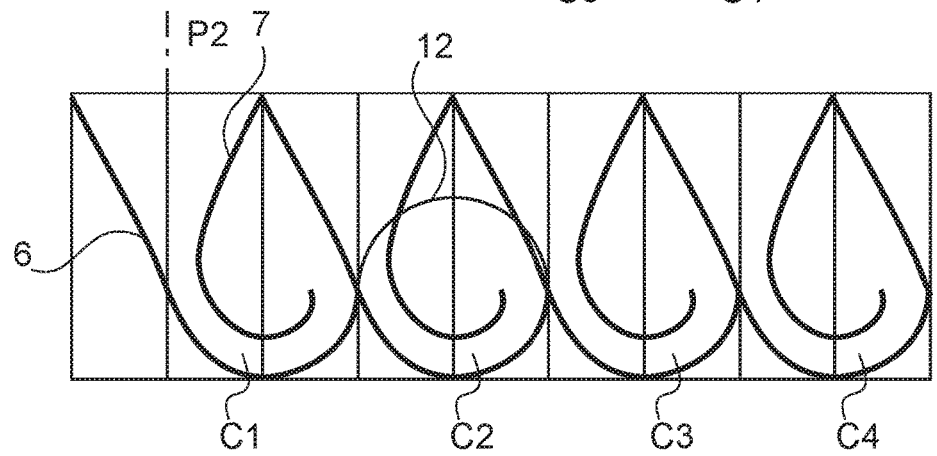

FIG. 9 represents four cells C1 . . . C4 of a sound-proofing covering according to an embodiment of the invention having, just like the covering of FIG. 8, cells having a duct whose first portion is symmetrical or quasi-symmetrical along the plane P2. It has, in particular, a section, in the cutting plane P, that is substantially "V" shaped. In the second portion of the duct, forming a curve turning 180° (relative to the general direction of the "V" shaped first portion, namely the third direction D3), the outer wall 6 at least partially follows a circle of construction 12. In as much as this second portion of the inner wall 7 also extends in the form of a circular arc, substantially parallel to the outer wall 6, the result thereof is that the dimensions d1, d2 and d3 are substantially equal in this embodiment.

This geometry has a very narrow and very long neck, allowing a significant acoustic reduction over low frequencies.

Figure 10:
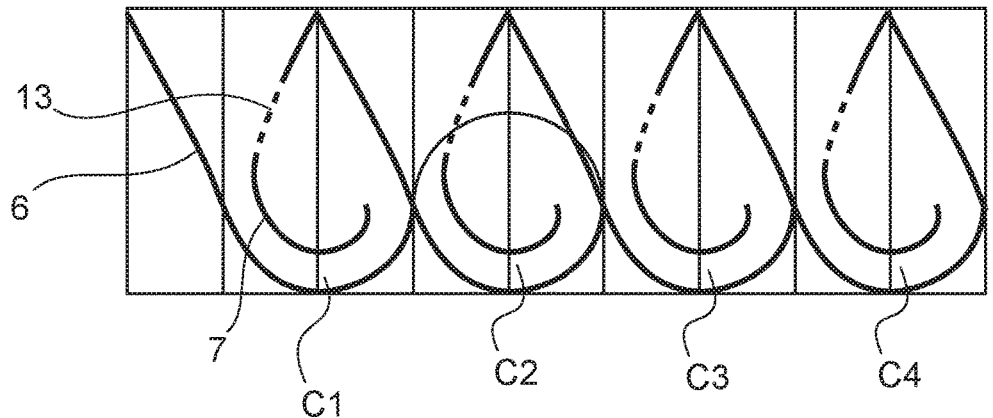
FIG. 10 represents a variant of the embodiment of FIG. 9, by a similar view.

FIG. 10 represents four cells C1 . . . C4 of a variant of the sound-proofing covering represented in FIG. 9. The geometry of the cells is in particular identical. In the variant of FIG. 10, the outer wall 6 comprises a perforation 13 allowing a passage of fluid between the neck of the resonator formed by the cell and its cavity. This perforation 13 can comprise one or more orifices which pass through the inner wall 7.

That reduces the acoustic resistance of the resonator. This reduction is nevertheless obtained at the cost of an alteration of the acoustic symmetry of the treatment. A perforation 13 can be formed for this purpose in all the embodiments of the invention, and, in particular, in the embodiments described with reference to FIGS. 4 to 14.

Figure 11:
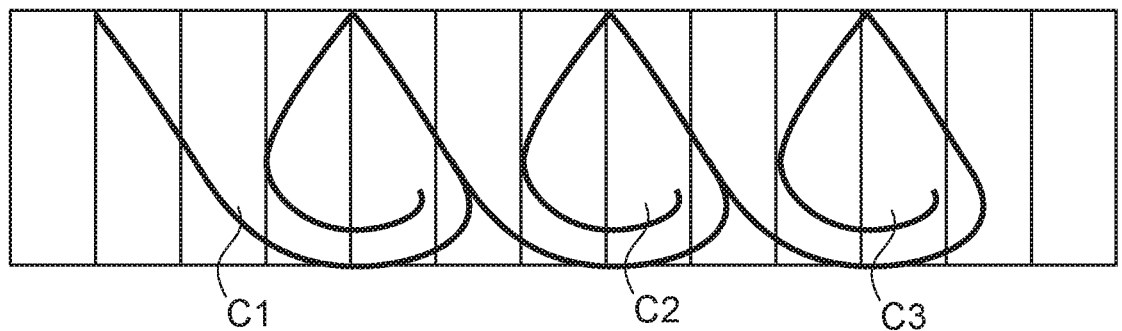
FIGS. 11 to 13 represent, by a cross-sectional schematic view, juxtaposed cells of sound-proofing coverings according to embodiments of the invention.

FIG. 11 represents three cells C1 . . . C3 of a sound-proofing covering according to an embodiment of the invention. The configuration of the duct is similar to that of the cells of the covering of FIG. 9, the duct being, in its first portion, symmetrical or quasi-symmetrical along the plane P2. The second portion of the duct is curved and is conformed such that the direction of the duct at its outlet is oriented at 180° relative to the general direction of the "V" shaped first portion, namely the third direction D3. The general geometry of the cell is, however, widened compared to the cells of the embodiment of FIG. 9. In particular, the opening of the cell on the first face 1 is greatly flared, the "V" formed by the first portion of the duct being more open, and the neck of the resonator formed by the duct being elongated. The volume of the cavity is increased. Lower frequencies can thus be treated. Nevertheless, the number of cells per square meter of covering is reduced, and the mechanical characteristics of the covering can be reduced.

Figure 12:
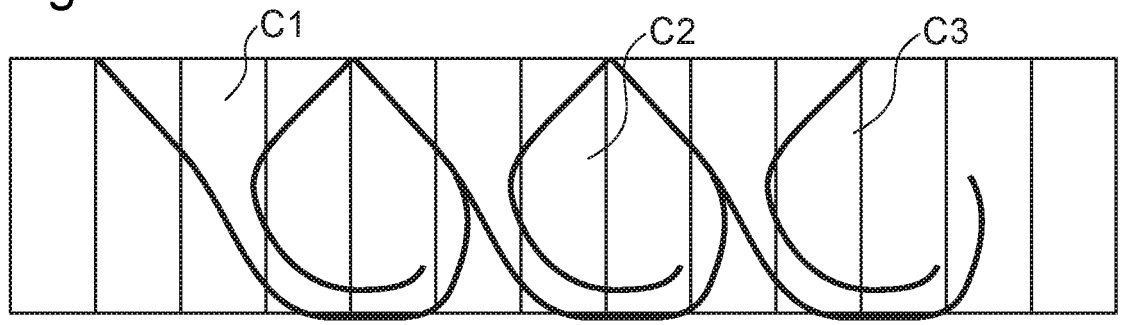

FIG. 12 represents three cells C1 . . . C3 of a sound-proofing covering according to an embodiment of the invention. The configuration of the duct is similar to that of the cells of the covering of FIG. 11, the duct being, in its first portion, symmetrical or quasi-symmetrical along the plane P2. The second portion of the duct forms a curve turning 180° or almost 180° (in this particular case around 160°). The first portion of the duct is shortened, which elongates the second portion but above all increases the volume of the cavity of the resonator. Lower frequencies can thus be treated, but the first portion of the duct is in the form of a shorter "V", which increases the acoustic resistance of the cell.

Figure 13:
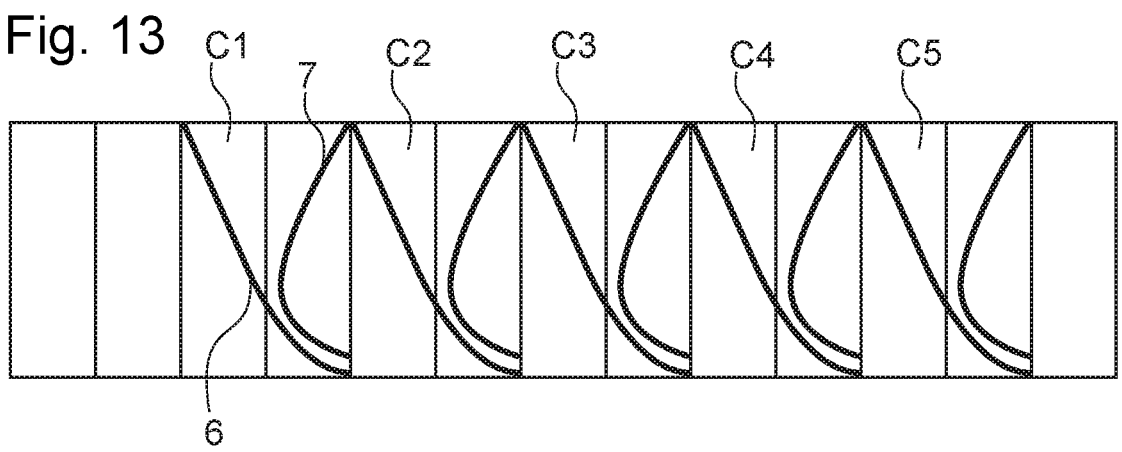

FIG. 13 represents five cells C1 . . . C5 of a sound-proofing covering according to an embodiment of the invention. In the embodiment of FIG. 13, the second portion of the duct forms, between the direction of the duct at its inlet and the direction of the duct, a curve turning 90° in the cutting plane P before emerging in the cavity of the resonator. In other words, the second portion emerges in the cavity in a direction orthogonal to its inlet direction. The first portion of the duct extending substantially along the third direction D3, the inlet in the cavity is made substantially in the second direction D2.

Figure 14:
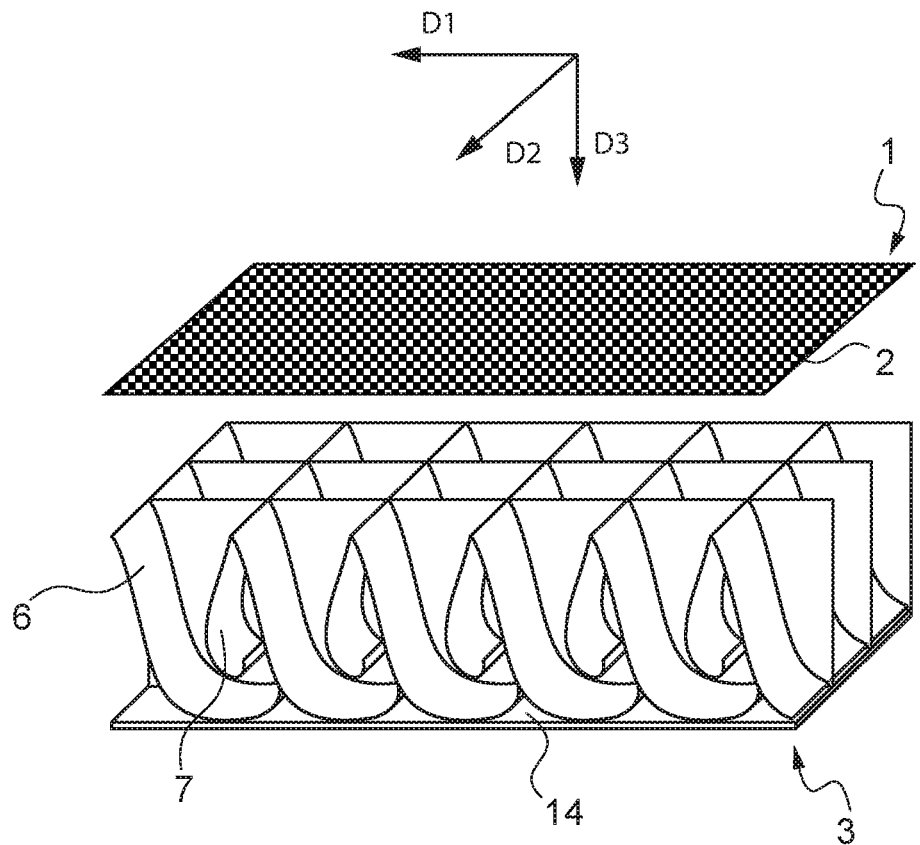
FIG. 14 represents, by a three-dimensional schematic view, a sound-proofing covering according to the embodiment of FIG. 7.

FIG. 14 represents a three-dimensional view of the embodiment of FIG. 8. The cells of the covering are separated from one another, in the transverse direction D2, by mutually parallel longitudinal walls 5. The outer 6 and inner 7 walls of the cells extend at right angles to the longitudinal walls 5.

A perforated plate 2, here shown exploded relative to the rest of the sound-proofing covering, forms the first face 1 of the sound-proofing covering. In all the embodiments of the invention, the first face of the sound-proofing covering can advantageously comprise a resistive layer, namely a perforated sheet 2 on the side of the inlet of the neck (for example similar to the perforated sheets employed in the state of the art) or a metal mesh (sometimes referred to by the expression "wiremesh").

Opposite, on its second face 3, the sound-proofing covering comprises a solid sheet 14 forming the second face 3 and giving the sound-proofing coating a good mechanical cohesion and, if necessary, closing the cells on the second face 3.

Since the coating has cells whose open face is square or rectangular, it exhibits a good effectiveness for flows both in the longitudinal direction D1 and in the transverse direction D2.

Since the inner wall 7 of a cell and the outer wall 6 of a longitudinally adjacent cell meet so as to form only a transverse wall at the first face 1, there is no loss of acoustic surface at the first face 1. In particular, in the example represented, the transverse wall that can be seen between two cells at the first face 1 is limited to a folding edge or a joining edge between the inner wall 7 of a cell and the outer wall 6 of an adjacent cell.

More particularly, the inner wall 7 of a cell of the covering and the outer wall 6 of an adjacent cell meet at the first face 1. The inner wall 7 and the outer wall 6 of an adjacent cell form between them an acute angle, that is to say an angle less than 90°, measured between the walls inside the acoustic covering. That forms a transverse edge at the first face 1. Such a configuration, just like the configuration represented in FIG. 6 in which a transverse vertical wall extends between two adjacent cells, means that the acoustic waves enter easily into the cells of the acoustic covering, instead of being reflected on the first face 1 if the join between the adjacent cells were made by a rounded wall at the first face 1.

The sound-proofing covering according to the invention can be produced in various materials, notably metal, plastic or composite. It can be obtained by various manufacturing methods, for example by the assembly of unitary elements. For example, a unitary element can form the inner wall of a cell and the outer wall of an adjacent other cell. The unitary element can be obtained by folding sheet metal, or molding a plastic or composite material. The longitudinal walls can be composed of flat sheet metal or flat panels of plastic or composite material. The assembly can be obtained for example by welding or bonding.

The cellular structure can alternatively be obtained by additive manufacturing, based on a plastic or metal material.

The sound-proofing covering thus developed allows the absorption of the acoustic waves over a lower frequency band than a sound-proofing covering of the same thickness constructed according to the known state of the art. By being based on a configuration with cellular structure in which the cells of the structure are separated transversely by parallel longitudinal walls, the industrial implementation of a covering according to the invention is easy.

The invention is preferentially applicable in the forming of a sound-proofing panel for the nacelle of an aircraft engine plant. An aircraft engine plant is represented schematically in cross section in FIG. 15. It comprises an engine 15 comprising a turbojet engine equipped with a fan 16, and which is installed in a nacelle 17. The covering 18 can be installed at various points that are particularly exposed to acoustic waves, in the nacelle and more generally in the engine plant. The covering 18 can be installed so as to form, at least partly, the inner face of the forward part of the nacelle of the aircraft engine plant. The covering 18 can be installed in a median zone of the inner face of the nacelle, aft of the fan 16. The covering 18 can also be installed on an inner face of the aft part of the nacelle. The covering 18 can also be installed on a casing of the engine 15.

The previous examples are mentioned by way of nonlimiting examples. The acoustic covering developed in the invention is applicable to any aircraft element of which one surface is subjected to an acoustic excitation in the operation of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sound-proofing covering comprising a cellular structure, the covering having a first face and a second face, said cellular structure being formed by cells that are open on said first face and closed on said second face, said cells being juxtaposed in a first, longitudinal direction and in a second, transverse direction which is orthogonal to the longitudinal direction;
   each cell comprising
      a duct extending at least between the first face and the second face, said duct being formed between an outer wall and an inner wall of the cell and having a restriction of its section, the outer wall and the inner wall having rounded forms, without sharp edges, and
      a cavity in which said duct emerges,
      such that the cell forms a resonator comprising a neck formed by said duct, and said cavity,
      wherein the cell is conformed such that the duct and the cavity are formed on either side of the inner wall,
      wherein the inner wall of a cell of the covering and the outer wall of an adjacent cell meet so as to form only a transverse wall separating said cell and adjacent cell at the first face,
      wherein the inner wall of the cell of the covering and the outer wall of the adjacent cell meet at the first face, forming therebetween an acute angle so as to form a transverse edge at said first face.

2. The sound-proofing covering according to claim 1, in which each cell has a substantially volute section in a longitudinal cutting plane at right angles to the transverse direction.

3. The sound-proofing covering according to claim 1, wherein the duct comprises, in succession:
   a first portion starting from the first face of the sound-proofing covering towards the second face of the sound-proofing covering, and
   a second portion forming a curve comprising an inlet and an outlet, and forming, between a direction of the duct at the inlet of said second portion and a direction of the duct at the outlet of said second portion, an angle of between 90° and 180°.

4. The sound-proofing covering according to claim 3, wherein the first portion of duct is substantially symmetrical along a transverse plane at right angles to the first face.

5. The sound-proofing covering according to claim 1, in which the duct forming the neck of the resonator and the cavity are dimensioned such that a resonant frequency of said resonator is lower than 2000 Hz.

6. The sound-proofing covering according to claim 1, wherein the first face comprises a resistive sheet allowing the cells of the covering to communicate with the outside of said covering.

7. The sound-proofing covering according to claim 1, wherein the inner wall of each cell comprises a perforation fluidically linking the neck to the cavity of the resonator.

8. An aircraft engine plant comprising a nacelle and an engine, wherein at least one of an inner surface of the nacelle or an outer surface of a casing of the engine has a sound-proofing covering according to claim 1.

* * * * *